(12) United States Patent
Nourian

(10) Patent No.: US 9,258,949 B2
(45) Date of Patent: Feb. 16, 2016

(54) ADJUSTABLE DRIP EMITTER

(71) Applicant: NATIONAL DIVERSIFIED SALES, INC., Woodland Hills, CA (US)

(72) Inventor: Daniel Nourian, Fresno, CA (US)

(73) Assignee: NATIONAL DIVERSIFIED SALES, INC., Woodland Hills, CA (US)

( * ) Notice: Subject to any disclaimer, the term of this patent is extended or adjusted under 35 U.S.C. 154(b) by 176 days.

(21) Appl. No.: 13/922,089

(22) Filed: Jun. 19, 2013

(65) Prior Publication Data

US 2014/0374502 A1  Dec. 25, 2014

(51) Int. Cl.
*B01F 15/02* (2006.01)
*A01G 25/02* (2006.01)

(52) U.S. Cl.
CPC .................... *A01G 25/023* (2013.01)

(58) Field of Classification Search
CPC . A01G 25/006; A01G 25/092; A01G 25/023; B01F 15/02
USPC ........... 239/11, 542, 547; 405/39–44; 138/40, 138/42, 73
See application file for complete search history.

(56) References Cited

U.S. PATENT DOCUMENTS

| | | | |
|---|---|---|---|
| 1,045,469 A * | 11/1912 | Van Zandt | B05B 1/185 239/559 |
| 3,729,142 A | 4/1973 | Rangel et al. | |
| 3,834,628 A | 9/1974 | Selman | |
| 3,979,070 A | 9/1976 | Lemelshtrich | |
| 3,998,391 A | 12/1976 | Lemelshtrich | |
| 4,036,435 A | 7/1977 | Pecaro | |
| 4,153,380 A | 5/1979 | Hartman | |
| 4,177,946 A | 12/1979 | Sahagun-Barragan | |
| 4,209,133 A | 6/1980 | Mehoudar | |
| 4,215,822 A | 8/1980 | Mehoudar | |
| 4,241,757 A | 12/1980 | Bron | |
| 4,281,798 A | 8/1981 | Lemelstrich | |
| 4,384,680 A | 5/1983 | Mehoudar | |
| 4,392,616 A | 7/1983 | Olson | |
| 4,428,397 A | 1/1984 | Bron | |
| 4,533,083 A | 8/1985 | Tucker | |
| 4,569,485 A | 2/1986 | Walto | |
| 4,722,481 A | 2/1988 | Lemkin | |
| 4,796,660 A | 1/1989 | Bron | |
| 4,824,025 A | 4/1989 | Miller | |
| 4,850,531 A | 7/1989 | Littleton | |
| 4,960,584 A | 10/1990 | Brown | |
| 4,998,556 A | 3/1991 | Bron | |
| 5,031,837 A | 7/1991 | Hanish | |
| 5,101,854 A | 4/1992 | Bron | |

(Continued)

*Primary Examiner* — Arthur O Hall
*Assistant Examiner* — Joseph A Greenlund
(74) *Attorney, Agent, or Firm* — Fulwider Patton LLP

(57) ABSTRACT

A flow-regulating drip emitter, comprising a base that includes an inlet connector configured for connection to an upstream line with a water source; and a cover attached to the base, the cover including an outlet connector configured for connection to a downstream line. At least one of the cover or the base defines at least a first labyrinth passageway having a first resistance to water flow and a second labyrinth passageway having a second resistance to water flow different from the first resistance to water flow; and further wherein the base and the cover are structured so that movement of the cover in relation to the base connects the inlet connector to the outlet connector via only the first labyrinth passageway, and wherein further movement of the cover in relation to the base connects the inlet connector to the outlet connector via only the second labyrinth passageway.

7 Claims, 7 Drawing Sheets

(56) References Cited

U.S. PATENT DOCUMENTS

| | | | | |
|---|---|---|---|---|
| 5,111,996 | A | 5/1992 | Eckstein | |
| 5,116,579 | A * | 5/1992 | Kobayashi | B01D 53/9409 422/111 |
| 5,137,216 | A | 8/1992 | Hanish | |
| 5,236,130 | A | 8/1993 | Hadar | |
| 5,251,871 | A | 10/1993 | Suzuki | |
| 5,316,220 | A | 5/1994 | Dinur | |
| 5,333,793 | A | 8/1994 | DeFrank | |
| 5,413,282 | A | 5/1995 | Boswell | |
| 5,421,363 | A | 6/1995 | Bron | |
| 5,435,490 | A | 7/1995 | Machut | |
| 5,458,712 | A | 10/1995 | DeFrank | |
| 5,522,551 | A | 6/1996 | DeFrank | |
| 5,605,042 | A * | 2/1997 | Stutzenberger | B01D 53/9431 60/286 |
| 5,615,838 | A | 4/1997 | Eckstein | |
| 5,820,029 | A * | 10/1998 | Marans | 239/542 |
| 5,927,326 | A | 7/1999 | Hiejima et al. | |
| 6,041,594 | A * | 3/2000 | Brenner | B01D 53/90 239/427.5 |
| 6,098,896 | A * | 8/2000 | Haruch | B01J 8/1827 239/432 |
| 6,238,081 | B1 * | 5/2001 | Sand | 366/182.4 |
| 6,273,133 | B1 | 8/2001 | Williamson et al. | |
| 6,308,902 | B1 | 10/2001 | Huntley | |
| 6,382,600 | B1 * | 5/2002 | Mahr | B01D 53/9431 261/115 |
| 6,513,323 | B1 * | 2/2003 | Weigl | B01D 53/9431 137/340 |
| 6,598,618 | B1 | 7/2003 | Shay | |
| 6,877,714 | B2 | 4/2005 | Hall | |
| 7,500,356 | B2 * | 3/2009 | Hirata | B01D 53/9431 222/149 |
| 7,571,603 | B2 * | 8/2009 | Ripper | B01D 53/90 222/145.5 |
| 7,690,396 | B2 | 4/2010 | Oh et al. | |
| 7,735,758 | B2 | 6/2010 | Cohen | |
| 7,988,076 | B2 | 8/2011 | Mamo | |
| 2001/0015067 | A1 * | 8/2001 | Darley | F01M 13/02 60/303 |
| 2004/0206070 | A1 * | 10/2004 | Shirakawa | F01N 3/0814 60/285 |
| 2007/0108318 | A1 | 5/2007 | Mamo | |
| 2008/0202104 | A1 * | 8/2008 | Ichikawa | F01N 3/2066 60/295 |
| 2009/0133383 | A1 * | 5/2009 | Shost | F01N 3/2066 60/276 |
| 2009/0255424 | A1 * | 10/2009 | Kusunoki | B01F 3/02 60/320 |
| 2009/0288396 | A1 * | 11/2009 | Sakata | F01N 3/208 60/286 |
| 2010/0163651 | A1 | 7/2010 | Feith et al. | |
| 2010/0200676 | A1 | 8/2010 | Allen et al. | |
| 2010/0301130 | B2 * | 12/2010 | Townsend | 239/11 |
| 2011/0095105 | A1 * | 4/2011 | Mortensen | F01N 3/2066 239/601 |
| 2011/0239631 | A1 * | 10/2011 | Bui | F01N 3/2066 60/295 |
| 2012/0085085 | A1 * | 4/2012 | Wright | F01N 3/2066 60/295 |
| 2012/0126036 | A1 | 5/2012 | Patel | |

* cited by examiner

ADJUSTABLE DRIP EMITTER

BACKGROUND

Drip irrigation systems have come into widespread use in the agricultural area. Drip irrigation systems supply water at a slow, controlled rate to the root zone of the particular plants being irrigated. Typically, drip irrigation is accomplished by providing a low volume water outlet at each plant that permits a limited dripping of water directly to the root zone of the particular plant. Because evaporation, runoff, overwatering, and watering beyond the root zone are eliminated, substantial water and nutrient savings are realized. In addition, drip irrigation reduces contaminants to the water table by enabling the farmer to supply only enough water and fertilizer to reach the plants, reducing excess water that would run off and contaminate the water table below.

Drip irrigation may be supplied by hoses having drip emitters built into the hose at manufacture. These are configured to cause a reduction in water pressure between the water in the hose, and water at an outlet of the emitter. Other systems have been developed in which a user may insert separately manufactured drip emitters into the hose at spaces that are more suited to the local environment and needs for irrigation. However, as the water travels along the hose away from the water source, the pressure of the water decreases. Thus, the water pressure at the beginning of the hose (near the water source) is greater than that at the far end of the hose. Because the drip rate of an emitter is a function of the water pressure, the drip rate at the beginning of the hose may tend to be greater than at the end of the hose. Other field conditions, such as elevation, also affect the pressure, and thus the drip rate, along the length of the hose. However, it is often desirable to have a relatively uniform drip rate along the length of the hose. Moreover, other varying field conditions, such as soil type and drainage, create a need to have different drip rates throughout the field to compensate for the different field conditions.

Thus there is a need in the field of drip irrigation for a versatile system that a user may adapt to the changing needs of the environment, and to the location of the emitter along the length of a hose, to create a desired drip flow profile. The present invention addresses these and other needs.

SUMMARY OF THE INVENTION

The present invention is directed to an adjustable drip emitter comprising a base that includes an outlet connector configured for connection to a downstream line; and a cover attached to the base, the cover including an inlet connector configured for connection to an upstream line with a water source. At least one of the cover or the base defines a first labyrinth passageway having a first resistance to water flow and a second labyrinth passageway having a second resistance to water flow different from the first resistance to water flow. The base and the cover are structured so that movement of the cover in relation to the base connects the inlet connector to the outlet connector via only the first labyrinth passageway, and wherein further movement of the cover in relation to the base connects the inlet connector to the outlet connector via only the second labyrinth passageway. In some embodiments, the first labyrinth passageway defines a first width and the second labyrinth passageway defines a second width, and wherein the first width is narrower than the second width. In some embodiments, the cover is structured in relation to the base so that, when the cover is attached to the base, the cover is capable of rotational movement in relation to the base. In some embodiments each of the first labyrinth passageway and the second labyrinth passageway follow a tortuous path that has a generally circular shape. In some embodiments the emitter further includes a third labyrinth passageway. In yet further embodiments, yet further movement of the cover in relation to the base connects the inlet connector to the outlet connector via only the third labyrinth passageway.

In further embodiments, the invention is a flow-regulating drip emitter, comprising a base that includes an outlet connector configured for connection to a downstream line, and a cover attached to the base, the cover including an inlet connector configured for connection to an upstream line with a water source. Also provided is a first means for reducing water pressure between the inlet connector and the outlet connector, and a second means for reducing water pressure between the inlet connector and the outlet connector, wherein the first means for reducing water pressure is configured to reduce water pressure to a greater degree than the second means for reducing water pressure. Further provided is a means for switching water flow through the drip emitter whereby, under a first switch setting the first means for reducing pressure receives no water flow and the second means for reducing pressure receives water flow, and under a second switch setting the second means for reducing pressure receives no water flow and the first means for reducing pressure receives water flow. In some embodiments, the means for switching includes a hollow hub protruding along a central axis of the cover, the hub having a slot and being configured so that rotation of the cover in relation to the base causes water flow to switch between the first means for reducing water pressure and the second means for reducing water pressure.

In yet further embodiments, the invention is a method for reducing water pressure between an inlet connection and an outlet connection of a drip-emitter, the method comprising, providing a housing that comprises a first labyrinth passageway having a first resistance to water flow and a second labyrinth passageway having a second resistance to water flow, the first resistance being greater than the second resistance. The inlet connection is inserted into a water line whereby water flows through the housing. Water flow is permitted through the first labyrinth passageway. This step is followed by switching off water flow through the first labyrinth passageway and this is followed again by switching on water flow through the second labyrinth passageway. In some embodiments, switching off water flow through the first labyrinth passageway includes rotating the first labyrinth passageway in relation to the inlet connection, and further, switching on water flow through the second labyrinth passageway includes rotating the second labyrinth passageway in relation to the inlet connection.

These and other features and advantages of the present invention will be better understood by reference to the following detailed description when considered in conjunction with the accompanying drawings.

DETAILED DESCRIPTION OF THE PREFERRED EMBODIMENTS

The present invention is directed to a drip irrigation emitter which, when a plurality of such emitters are inserted sequentially into hosing will provide drip irrigation at periodic intervals over a length of hose. Each individual drip emitter of the present invention has the capacity to allow a user to set a flow rate for a given pressure, the flow rate chosen between a plurality of possible flow rates.

In one embodiment, the invention is directed to an adjustable emitter comprising separable and attachable elements. When these emitters are connected to an elongate hose, a user may adjust the drip settings to provide a desired flow outcome in any given landscape.

Figure 1:
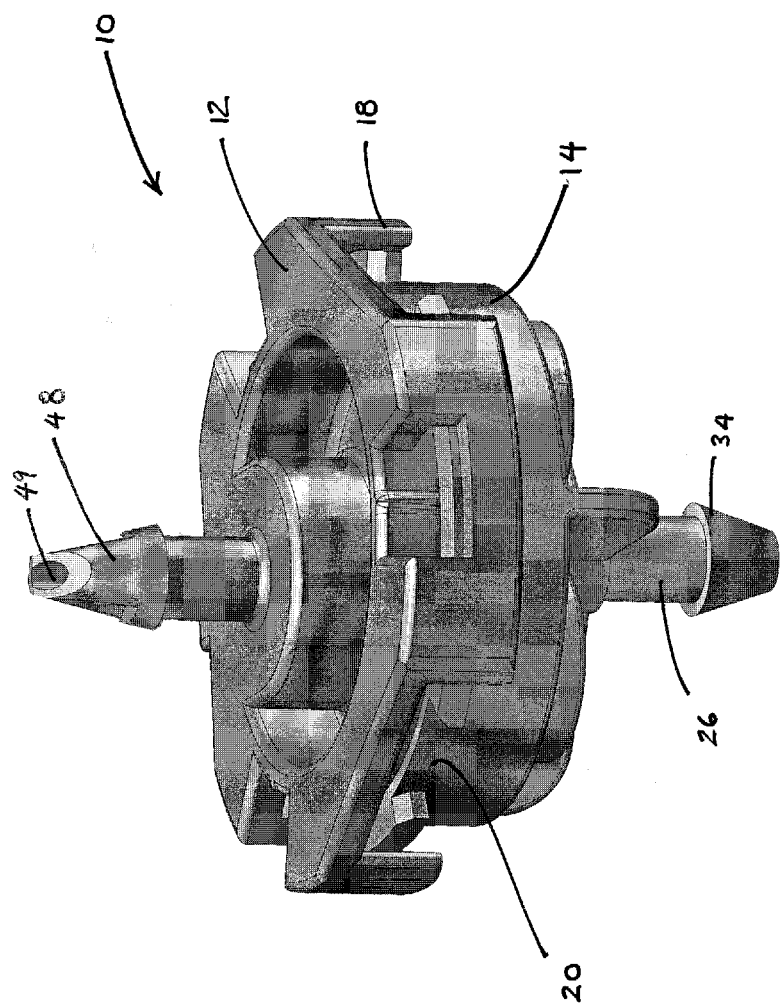
FIG. 1 is a perspective view of a drip emitter having features of the present invention.

As seen in FIG. 1, a drip emitter 10 having features of the invention is shown. In some embodiments, the drip emitter comprises a cover 12 having a circular profile and a base 14 having a circular profile. The cover is configured to be connected to the base. To this end, in some embodiments, the cover is provided with three bent fingers 18 situated at evenly spaced intervals along a circumference on the circular profile of the cover. Three slots 20 are provided on the base, the slots being discontinuities in a circular flange 24 that surrounds the base. The slots are also spaced along a circumference of the circular profile of the base, in mating locations so that, when the cover is brought into contact with the base, the fingers 18 may pass through the slots 20. Then, the cover may be rotated in relation to the base, and the fingers pass underneath a lower surface of the flange 24. The result is that the cover 12 is attached to the base 14, while maintaining the ability to rotate in relation to the base.

Figure 2:
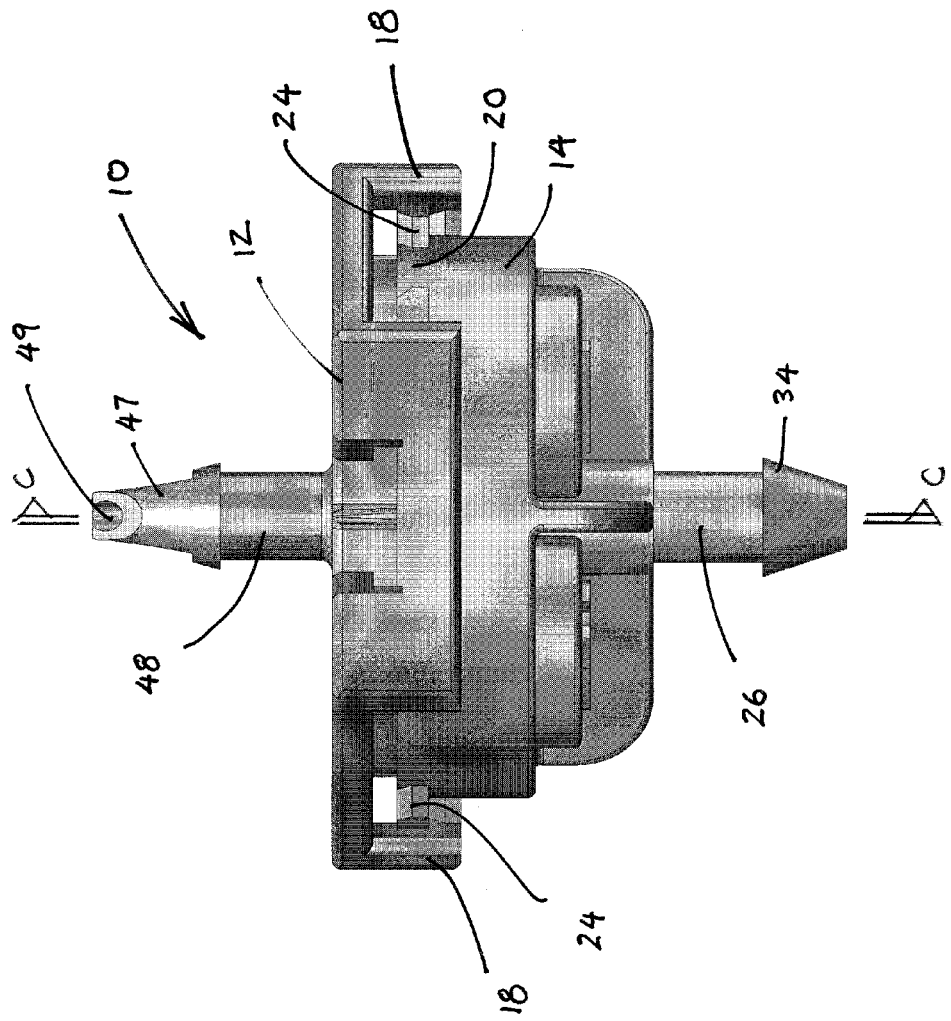
FIG. 2 is a side elevational view of the drip emitter shown in FIG. 1.

As seen in FIGS. 1 and 2, when the cover 12 is attached to the base 14, the emitter 10 comprises a compact unit, which forms a housing. This unit includes an internal passage for water to flow through the emitter, a passage that is sealed from leakage but which presents an inflow port and an outflow port. As will be seen in more detail below, the internal passage of the emitter shown in this embodiment actually includes three potential passages that are individually selectable by a user of the emitter. The number of passageways may be two, or more than two, such as three or four.

Figure 3:
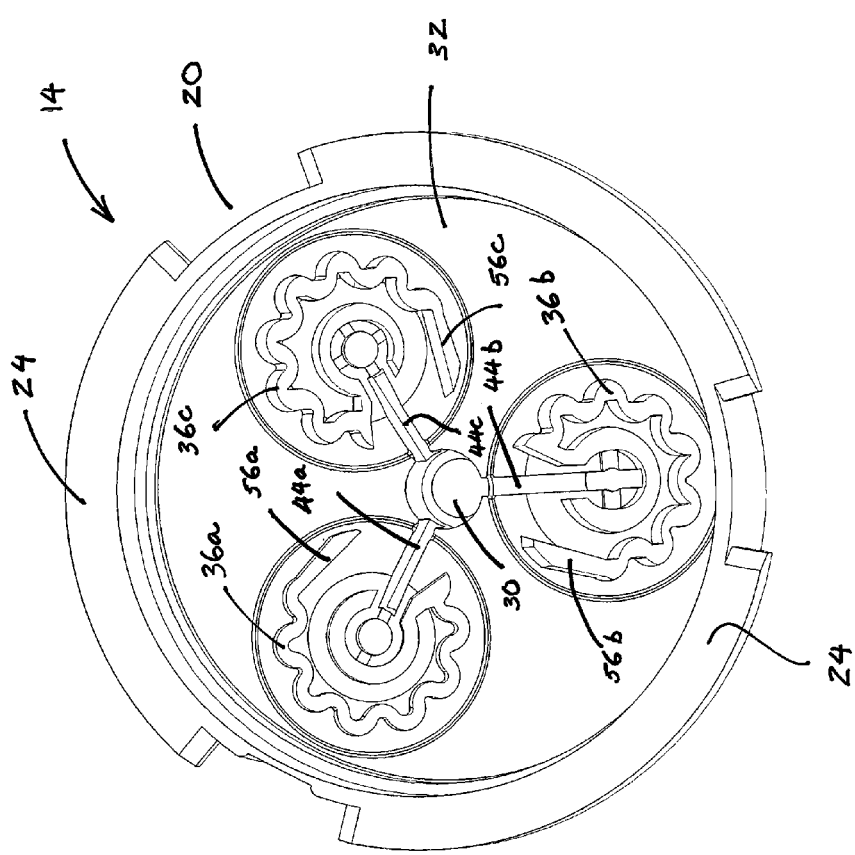
FIG. 3 is a perspective view, obliquely from above, of a lower base portion of the drip emitter shown in FIG. 1.

Specifically, the base 14 comprises a hollow outlet connector 26 extending downwardly along a central axis B-B of the base. The outlet connector defines an outlet bore 28 (FIG. 6) which defines a port 30 opening into a center point of an upper surface 32 of the base as seen in FIG. 3. The spike may include a barbed tip 34 for connection to a downstream line (not shown), according to known methodology. The downstream line extends to the point of drip emission.

FIG. 3 is an oblique downward view onto an upper surface 32 of the base 14. As seen in FIG. 3 three labyrinth passageways 36a, 36b, 36c are cut or molded into the upper surface 32. Each one is designed so that water may flow from one end of the labyrinth to the other end, and thereby to undergo turbulent flow which will cause resistance to flow, and a consequent reduction in water pressure over the course of the labyrinth. However, as will be described more fully below, the emitter is configured so that only one labyrinth can receive water flow at any time, as elected by the user. As may be seen in FIG. 3, in some embodiments, the labyrinths may each follow the same general tortuous path of approximately equal length, but the first labyrinth 36a is narrower than the second 36b which in turn is narrower than the third 36c. The tortuous paths are configured to reduce the flow rate of the water through the emitter, and thereby effectively to reduce the water pressure at an output port of the emitter in relation to the water pressure at an inlet port. It will be appreciated by those skilled in the art that the narrower the labyrinth through which the water is forced to flow, the greater the resistance to water flow, and the greater the pressure reduction will be across the emitter. The general use of a labyrinth passageway to reduce pressure in flowing water is known, and described in the prior art.

Figure 4:
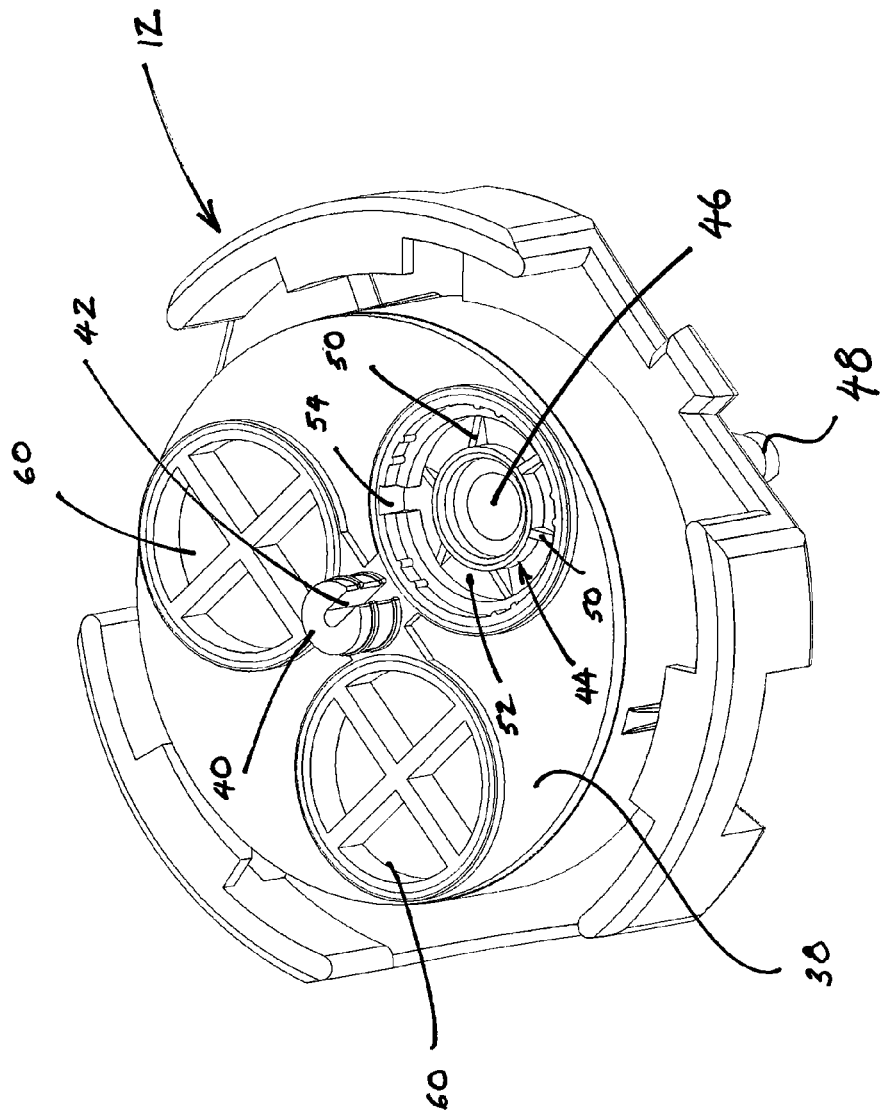
FIG. 4 is a perspective view, obliquely from below, of an upper cover portion of the drip emitter shown in FIG. 1.

FIG. 4 shows an oblique upward view onto a lower surface 38 of the cover 12. The lower surface 38 defines a downwardly protruding hub 40 that is shaped to fit into the port 30 of the upper surface 32 of the base 14 when the cover 12 and base 14 are connected. The hub 40 is shaped to include a slot 42 that faces radially outwardly. This configuration has the result that, when the cover 12 is connected with the base 14 as seen in FIG. 1, the cover 12 may be rotated in relation to the base 14 so that the slot 42 faces, in a registration position, a selected one of ending points 44a, 44b, 44c of one of the labyrinths. This may be envisaged with reference to FIG. 3 together with FIG. 4.

Figure 6:
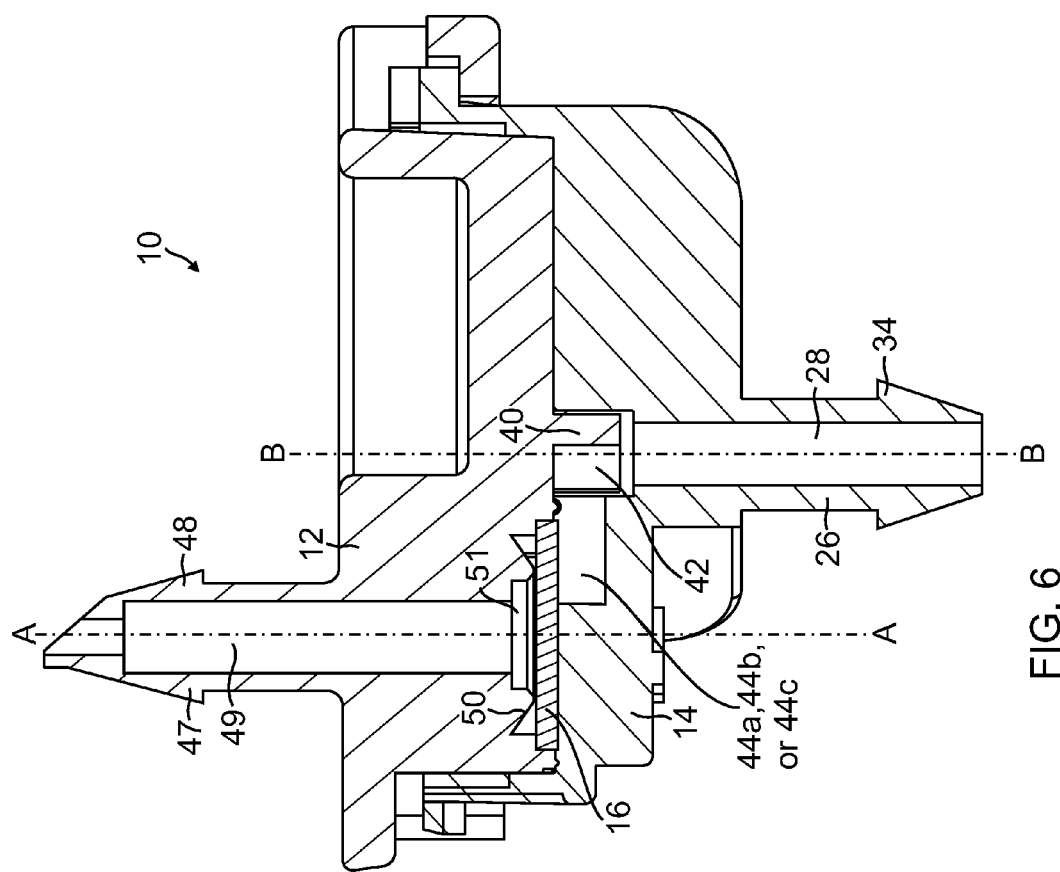
FIG. 6 is a sectional view taken vertically through the center of the emitter seen in FIG. 1, and substantially along the line C-C in FIG. 2, and viewed in the direction of the arrows associated with line C-C.
Figure 7:
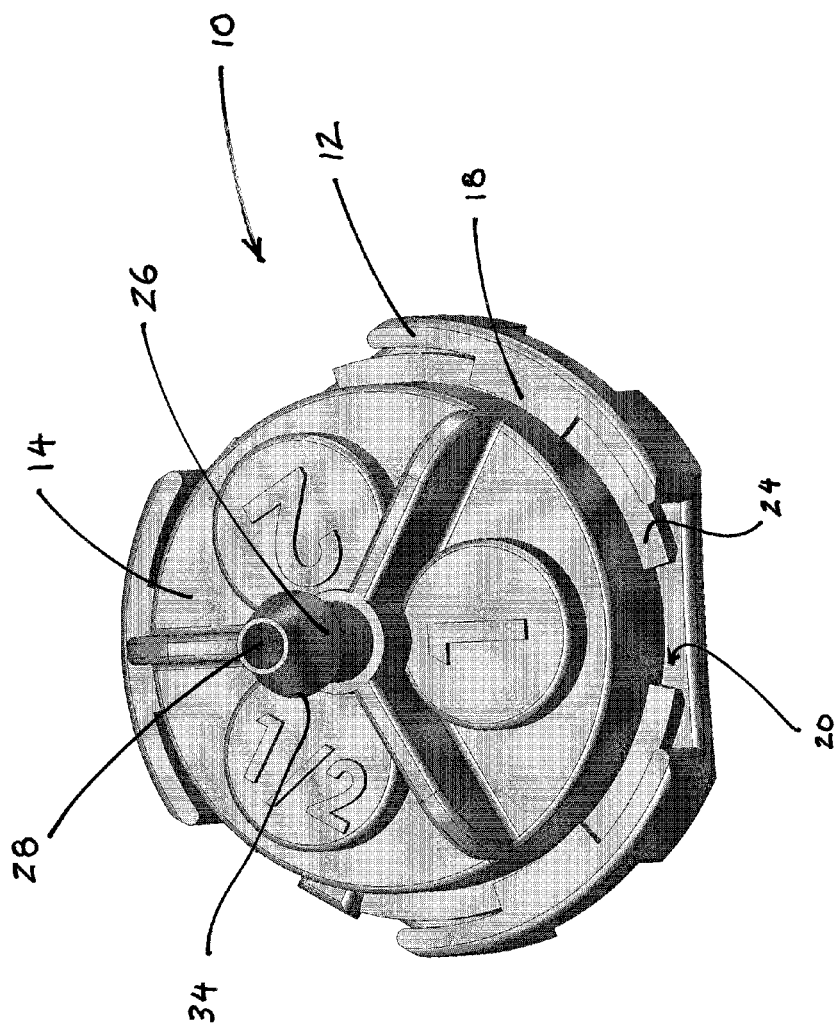
FIG. 7 is a perspective view of the drip emitter of FIG. 1, seen from a bottom side if the drip emitter.

FIG. 4 also shows that a generally circular cylindrical reservoir 44 may be cut or molded into the upper surface 38 of the cover 12. The reservoir defines an inlet port 46 in the center of the reservoir roof 52. FIG. 6 shows that, on an upper surface of the cover 12, a hollow inlet connector 48 may extend upwardly and includes an inlet bore 49 extending along an axis A-A that is offset from the central axis B-B of the emitter. The inlet connector 48 may include a spiked barb 47 to facilitate connection to a hose (not shown) carrying the water supply for the emitter. The inlet port 46 (FIG. 4) is configured to receive water entering the emitter 10 from the inlet bore 49 of the inlet connector 48.

Figure 5:
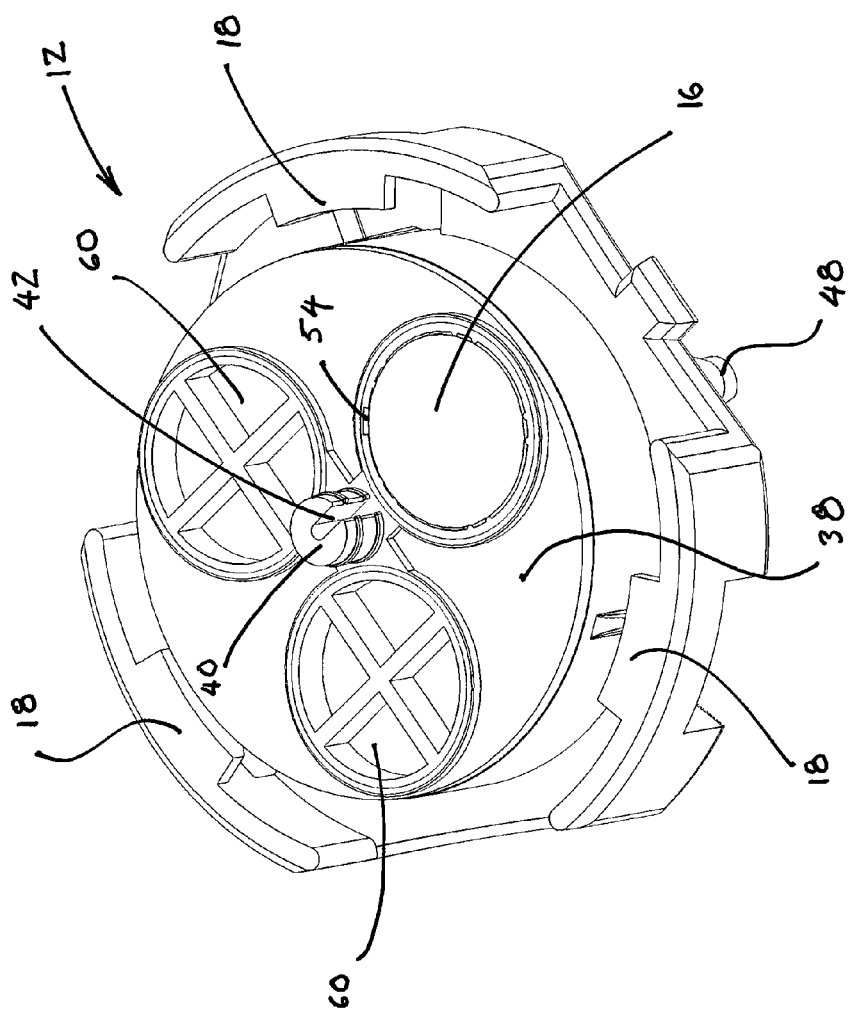
FIG. 5 is the view of the portion seen in FIG. 4, showing an additional plug element of the invention.

FIG. 5 shows the same view of the cover 12 as FIG. 4, but additionally shows how a circular rubber or polymer plug 16, or diaphragm, is positioned within the reservoir 44. Ribs 50 molded radially into the roof 52 of the reservoir 44 prevent the plug 16 from advancing all the way into the reservoir, so that a gap 51 (as seen in FIG. 6) must exist between the roof 52 of the reservoir and the plug 16.

Furthermore, FIGS. 4 and 5 show that the reservoir 44 is not exactly circular all the way round its perimeter. Along an arc length of about 10 degrees of the circumference, the radius of the reservoir increases (compared to the balance of the circumference radius) to provide a slot in the wall of the reservoir which may operate as an upper gate 54 whose function is described below.

FIG. 3 shows that the labyrinths 36a, 36b, 36c each extend along a generally circular (and tortuous) path, but that at the starting points of each labyrinth, the path increases its circular radius along an arc length of about 30 degrees. These starting points form lower gates 56a, 56b, 56c whose function will be explained further below. The lower gates are configured so that, when the cover 12 and base 14 are connected to each other, they will sequentially register with the upper gate 54 if the cover is rotated in relation to the base. Furthermore, the cover and base are configured so that, when the upper gate 54 is in registration with each one of the lower gates, then also, the slot 42 will be aligned with each respective one of the ending points 44a, 44b, or 44c of one of the labyrinths. When thus registered, water may pass from the upper gate 54 into one of the lower gates, and thence along the labyrinth. But, as one skilled in the art will appreciate, the plug 16 which is under pressure from the water in the gap 51, will prevent water flow from the gap 51 in the reservoir into any other point along a labyrinth other than a lower gate. Thus, when the emitter 10 is used, the user will rotate the cover 12 in relation to the base 14 until a series of tactile clicks, caused by detents (not shown) passing across each other, warn the user that registration has been achieved between the slot 42 on the hub 40 and a chosen end point 44a, 44b, 44c of one of the labyrinths 36a, 36b, 36c. (and also, that registration has been achieved between the upper gate and the respective lower gate.) When the correctly selected labyrinth is in registration with the slot 42, the user may forcefully insert the barbed tip 47 of the inlet connector 48 into a hose. Water from the hose will then be able to flow through the bore 49 of the inlet connector 48, through the port 46, and into the gap 51 of the reservoir. One skilled in the art will appreciate that the water pressure in the gap will force the plug to seat comfortably on the outline of the respective labyrinth, thus sealing the roof of the labyrinth. The water then will flow through the upper gate 54 into a respective lower gate 56a, 56b, or 56c, and thence into the selected labyrinth where it will be slowed down by turbulence (and thus will lose pressure), until the water reaches the selected end point 44a, 44b, or 44c of the respective labyrinth.

It will also be appreciated by one of skill in the art that the effect of water pressure in the gap 51 may apply pressure to the plug 16 so that there is a slight throttling effect on water in the labyrinth. Therefore, under high water pressure from the hose (not shown) a choking effect may reduce water flow slightly, and under low water pressure, a releasing effect may increase water flow slightly. This throttling effect is an advantage in the emitter 10 in that it tends to even out water flow through the emitter even if water pressure in the hose (not shown) varies.

As noted above, when there is registration between the slot 42 and a selected labyrinth, there will also be registration between the lower gate of the selected labyrinth and the upper gate 54. Thus, the water will flow from the selected labyrinth into the slot 42, through the bore 30, and thence down the outlet bore 28 of the outlet connector 26 into a pipe (not shown) that will transport the water, now under a pressure that is reduced in relation to the pressure in the hose, to a drip emission site.

Finally, in some embodiments, the emitter may include pressure pads 60 molded onto the cover 12 and spaced at 120 degrees around the lower surface 38 of the cover 12. These pads are configured to provide balancing forces to the cover 12 as it is rotated about the base 14. It will be appreciated by those of skill in the art that the reservoir 44 with its plug 16 in the cover will be rotated across the labyrinths sequentially, so that at any one time, the plug 16 will be in contact with only one reservoir. This contact point may cause the cover to be subject to unbalanced force, and so the pads 60 are provided to provide a force-equivalent to the plug, an equivalent force that will always be in contact with the non-selected labyrinths. This feature provides balanced three point forces on the cover, to enhance the overall water tightness of the emitter, and also to provide a more satisfactory tactile communication, for the user, with the emitter.

Thus, it will be appreciated that the drip emitter as described presents a user with a simple, compact, and inexpensive system and method for assembling a length of hose having a plurality of drip emitters along its length. Furthermore, each drip emitter may be custom set by the user to have an irrigation rate as desired by the user. For example, if the user wishes to maintain a constant rate of flow from the emitters along the length of the hose, he may set the emitter closest to the water source to be in registration with the labyrinth having the narrowest width. Then, the next emitter may be set to have the labyrinth with an intermediate width. Finally, the emitter furthest from the water source may be set to have the labyrinth with the widest width. This graduated variation in emitters along the length of the hose allows the entire hose to more closely approximate a system that has a constant discharge rate from the emitters positioned along the length of the hose. Furthermore, the emitter 10 has the advantage of being configured to provide a slight throttling effect, under which variations in pressure from the hose translate into attenuated variations in water flow through the emitter.

A further advantage of the present invention, is that after the hose and emitters have been in use under a first selection of settings, the user may subsequently return to the emitters and re-set them to another labyrinth setting. Such a need may arise where the hose with emitters attached is to be transported to a different site, where the user concludes that his original settings do not provide the emission profile that he desires, or where environmental changes force a different set of emitter settings.

Thus, the embodiments described provide an advantageous system and method for drip emitters. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

I claim:

1. A flow-regulating drip emitter, comprising:
   a base that includes an outlet connector configured for connection to an downstream line; and
   a cover attached to the base, the cover including an inlet connector configured for connection to an upstream line with a water source; wherein
   at least one of the cover or the base defines a continuous surface, and into the continuous surface there is formed at least a first labyrinth passageway having a first resistance to water flow and a second labyrinth passageway having a second resistance to water flow different from the first resistance to water flow; and further wherein
   the base and the cover are structured so that movement of the cover in relation to the base connects the inlet connector to the outlet connector via only the first labyrinth passageway, and wherein further movement of the cover in relation to the base connects the inlet connector to the outlet connector via only the second labyrinth passageway.

2. The emitter of claim 1, wherein the first labyrinth passageway defines a first width and the second labyrinth passageway defines a second width, and wherein the first width is narrower than the second width.

3. The emitter of claim 1, wherein the cover is structured in relation to the base so that, when the cover is attached to the base, the cover is capable of rotational movement in relation to the base.

4. The emitter of claim 1, wherein each of the first labyrinth passageway and the second labyrinth passageway follow a tortuous path that has a generally circular profile.

5. The emitter of claim 1, further including a third labyrinth passageway.

6. The emitter of claim 5, wherein yet further movement of the cover in relation to the base connects the inlet connector to the outlet connector via only the third labyrinth passageway.

7. The emitter of claim 1, wherein the continuous surface is a planar surface.

* * * * *